United States Patent [19]

Graham et al.

[11] Patent Number: 4,717,594

[45] Date of Patent: Jan. 5, 1988

[54] HIGH STRENGTH PARTICULATES

[76] Inventors: John W. Graham, Rte. 5, Box 289 (210 Co. Rd. 147), Alvin, Tex. 77511; A. Richard Sinclair, 2903 Virginia, Houston, Tex. 77098

[21] Appl. No.: 769,304

[22] Filed: Aug. 26, 1985

Related U.S. Application Data

[63] Continuation of Ser. No. 626,754, Jul. 2, 1984, Pat. No. 4,585,064.

[51] Int. Cl.$^4$ .................... B05D 3/02; B05D 7/00; E21B 43/267
[52] U.S. Cl. .................... 427/214; 427/221; 427/379
[58] Field of Search .................... 427/214, 221, 379; 428/404, 406, 407; 166/280

[56] References Cited

U.S. PATENT DOCUMENTS

| | | | |
|---|---|---|---|
| 3,867,178 | 2/1975 | Ritter et al. | 427/214 |
| 4,315,959 | 2/1982 | Buys et al. | 427/214 |
| 4,443,347 | 4/1984 | Underdown et al. | 427/221 X |
| 4,585,064 | 4/1986 | Graham et al. | 166/280 |

Primary Examiner—Michael R. Lusignan
Attorney, Agent, or Firm—Arnold, White & Durkee

[57] ABSTRACT

A high strength self-consolidating particle comprised of a particulate substrate, a substantially cured inner resin coating and a fusible curable outer resin coating.

18 Claims, No Drawings

HIGH STRENGTH PARTICULATES

This is a continuation application, Ser. No. 626,754, filed July 2, 1984, now U.S. Pat. No. 4,585,064, patented Apr. 29, 1986.

FIELD OF THE INVENTION

The present invention relates to self-consolidating resin coated particles. The improved particulate material of this invention has utility including, but not limited to, use as a proppant in hydraulic fracturing in subterranean formations.

BACKGROUND OF THE INVENTION

In the completion and operation of oil wells, gas wells, water wells, and similar boreholes, it frequently is desirable to alter the producing characteristics of the formation by treating the well. Many such treatments involve the use of particulate material. For example, in hydraulic fracturing, particles (propping agents or proppants) are used to maintain the fracture in a propped condition. In hydraulic fracturing, propping agent particles under high closure stress tend to fragment and disintegrate. At closure stresses above about 5000 psi, silica sand, the most common proppant, is not normally employed due to its propensity to disintegrate. The resulting fines from this disintegration migrate and plug the interstitial flow passages in the propped interval. These migratory fines drastically reduce the permeability of the propped fracture.

Other propping agents have been used to increase well productivity. Organic materials, such as the shells of walnuts, coconuts and pecans have been used with some success. These organic materials are deformed rather than crushed when a fracture closes under the overburden load. Aluminum propping agents are another type of propping agent that deforms rather than fails under loading. While propping agents such as those avoid the problem of creating fines, they suffer the infirmity of allowing the propped fracture to close as the proppant is squeezed flatter and flatter with time. In addition, as these particles are squeezed flat the spaces between the particles grow smaller. This combination of decreased fracture width and decreased space between the particles results in reduced flow capacities.

An improved proppant over the materials mentioned above is spherical pellets of high strength glass. These high strength glass proppants are vitreous, rigid and have a high compressive strength which allows them to withstand overburden pressures of moderate magnitude. In addition, their uniform spherical shape aids in placing the particles and providing maximum flow through the fracture. While these beads have a high stength when employed in monolayers, they are less satisfactory in multilayer packs. In brine at 250° F., the high strength glass beads have a tendency to disintegrate at stress levels between 5000 and 6000 psi with a resultant permeability which is no better, if not worse than sand under comparable conditions.

Resin coated particles have been used in efforts to improve the stability of proppants at high closure stresses. Sand or other substrates have been coated with an infusible resin such as an epoxy or phenolic resin. These materials are superior to sand at intermediate stress levels. However, at high temperature and high stress levels, the resin coated particles still show decrease in permeability to about the same degree as silica sand.

U.S. Pat. No. 3,492,147 to Young et al. describes a process for producing particulate solid coated with an infusible resin. The particulates to be coated include sand, nut shells, glass beads and aluminum pellets. The resins used include urea-aldehyde resins, phenol-aldehyde resins, epoxy resins, furfuryl alcohol resins and polyester or alkyd resins. These particles are used as proppants in fracturing operations.

U.S. Pat. No. 4,443,347 also describes a method for propping fractures in subterranean formations using proppants comprised of sand particles with a precured phenol formaldehyde resin coating.

U.S. Pat. No. 3,929,191 to Graham et al. discloses a method for producing coated particles for use in treating subterranean formations. Particles in this method are coated with a resin dissolved in a solvent which is then evaporated. The patent also discloses the coating may be produced by mixing the particles with a melted resin and subsequently cooling the mixture, forming a coating of resin on the particles. The Graham patent also discloses that the addition of coupling agents to the system improves the strength of the resin-substrate bond.

Although self consolidating resin coated sands have proven satisfactory in numerous applications, concern exists over their use under high closure stresses. As the self consolidating resin coated particles of the prior art do not develop their full strength until the resin coating has cured in the formation in the event of rapid closure of the fracture the proppant could be crushed before the resin cured resulting in decreased permeability. The present invention through the use of a dual resin coating eliminates this problem.

SUMMARY OF THE INVENTION

The present invention provides an improved resin coated particle comprising a particulate substrate, a substantially cured inner resin coating and a heat curable outer resin coating.

The invention also provides an improved method for treating subterranean formations comprising placing in the formation a quantity of free-flowing, heat curable particles comprised of a substrate, a substantially cured inner resin coating and a heat curable outer resin coating; and causing the free-flowing heat curable particles to cure and form a coherent mass.

The present invention also provides an improved method for producing a heat curable dual resin coated particle. These improved curable resin coated particles are produced by first coating the substrate with a reactive resin and substantially curing that resin. A second or outer coating of a heat curable resin is then coated over the inner resin.

DESCRIPTION OF THE INVENTION

The present invention can be carried out with any suitable substrate. Choice of the particulate substrate is governed by the properties required of the cured mass.

For example, in the oil and gas industry extremely high strength proppants are needed to hold open formation fractures created by hydraulic fracturing. In such an application, the present invention may use spherical glass beads as the particulate substrate. Such beads are available commercially in a variety of mesh sizes. For example, Union Carbide Corporation supplies vitreous, rigid, inert, substantially spherical pellets under the tradename UCAR props. Such beads, while of extremely high strength when employed in monolayers are less satisfactory when placed in multilayer packs. These beads when resin coated by the process of this invention and then cured in place yield a permeable mass of higher compressive strength than either the beads alone or resin coated beads of the prior art. Beads from about 6 to about 200 mesh are generally used. In extreme environments where stresses are very high, sintered bauxite, aluminum oxide, ceramics such as zirconium oxide and other mineral particulates may be coated. Particles from 6 to 200 mesh are generally used. (All reference to mesh size of the claims and specification are to the U.S. standard sieve series).

Also suitable for use as substrates are various organic materials such as walnut and pecan shells, synthetic polymers such as nylon, polyethylene and other resin particles. Metallic particles such as steel and aluminum pellets can also be coated.

In less severe conditions, conventional frac sand is the preferred particulate substrate of the invention. Silica sand of about 6 to 200 mesh (U.S. standard sieve) is generally used. One of the principal advantages of the instant invention is that frac sand coated by the method of this invention is as strong or stronger than the more expensive proppants described above. Just as importantly, in conditions where extreme stresses are expected the usable range of such high stress proppants as bauxite and the other ceramics can be extended by following the teaching of this invention.

Resin

Resins suitable for the inner and outer coatings are generally any resins capable of being coated on the substrate and then being cured to a higher degree of polymerization. Examples of such resins include phenol-aldehyde resins of both the resole and novolac type, urea-aldehyde resins, melamine-aldehyde resins, epoxy resins and furfuryl alcohol resins. The resins must form a solid nontacky coating at ambient temperatures. This is required so that the coated particles remain free flowing and so that they do not agglomerate under normal storage conditions. The resin of the outer coating must be fusible to allow cross linking of the resin coated particles during curing.

The preferred resins are the phenol-formaldehyde resins. These resins include true thermosetting phenolic resins of the resole type and phenolic novolac resins which may be rendered heat reactive by the addition of catalyst and formaldehyde. Such resins with softening points of 185° to 290° F. are acceptable.

The inner and outer coatings can be formed starting with the same or different resins. For example the inner coating could be produced from a resole and the outer coat from a novolac. However, for practical reasons the use of the same resin for both coatings is preferred.

Regardless of which type of resin is employed a coupling agent as subsequently described is preferably incorporated into the resin to be used as the inner coating during its manufacture. The coupling agent which has a functional group reactive in the resin system is added in an amount ranging from about 0.1 to 10% by weight of the resin. The preferred range is from about 0.1 to 3% by weight of the resin. When using the preferred phenol formaldehyde resins, the coupling agent is incorporated into the resin under the normal reaction conditions used for the formation of the phenol-formaldehyde resin. The coupling agent is added to the resin reactants prior to the beginning of the phenol formaldehyde condensation reaction.

The preferred resin to be used with the method of the present invention is a phenolic novolac resin. Particularly suitable is a phenolic novolac resin manufactured by Reichold Chemicals, Inc. under the tradename FOUNDREZ® 96-880. This resin has a softening point of 207° to 216° F. When such a resin is used it is necessary to add to the mixture a crosslinking agent to effect the subsequent curing of the resin. Hexamethylenetetramine is the preferred material for this function as it serves as both a catalyst and a source of formaldehyde.

The addition of organic acid salts such as calcium stearate to the resin used as the outer coating is advantageous as it acts as a lubricant and imparts a degree of water repellency to the finished product and aids in preventing sintering of the product during storage. The organic acid salt may be added to the resin or more conveniently may be simply added as a powder at the time the outer resin coat is added to the coated substrate.

Problems associated with the sintering of the product during storage can be further minimized by increasing the stick point of the outer resin coating. Raising of the stick point avoids problems of sintering and lumping of the resin coated particles when stored at high temperatures (100° F.–1500° F.).

Stick point is measured by applying the resin coated particles to a square metal rod heated at one end. The rod has a uniform temperature gradation from its heated end to its unheated end. After one minutes the particles are dusted from the rod. The temperature of the point along the rod at which the particles adhere to the rod is measured and is the stick point.

To increase the stick point a small amount of dry hexamethylenetetramine can be added to the flake novolac resin before it is charged to the muller. The reaction of the hexamethylenetetramine with the resin during the initial phase of the hot coating process of the outer resin coating allows for some polymerization of the resin to occur before cooling. This polymerization results in an increase in the resin stick point.

The amount of hexamethylenetetramine added in this manner is dependent upon the final stick point desired. Generally about 1 to about 10% dry hexamethylenetetramine based on the weight of the flaked resin is added. For example, the addition of 2.8% hexamethylenetetramine to the resin in the manner just described elevated the stick point of the finished product from 210° to 238° F. This increase in stick point is sufficient to remedy the storage problems of sintering and lumping.

Another problem encountered in the use of the product of the instant invention is the creation of dust during handling operations in the field. The resin coating on the particles is brittle; and abrasive action between the particles during high velocity transport generates fine particles of free resin. This dust is objectionable to observe and its elimination is desirable.

Incorporation of a small amount of polyvinyl acetal resin into the resin coating has been found to increase the resin strength and thereby reduce its brittleness. This results in reduction of the dusting problem.

The preferred polyvinyl acetal for this application is polyvinyl butyral although other resins such as polyvinyl formals may be used.

Specifically, a polyvinyl butyral, BUTVAR V-76 manufactured by Monsanto Company has proven to be effective in strengthening the resin coating and reducing the dust problem.

In addition, the inventors have also found that the addition of a small amount of a non-volatile oil such as mineral oil to the finished particles substantially eliminates the dust problem. For example, the inventors have found that the addition of 100 cc of mineral oil to 1000 lbs of resin coated particles immediately following the coating process essentially eliminates all dusting problems.

Coupling Agent

The coupling agent to be employed is chosen based on the resin to be used. For phenolic resins, the preferred coupling agents are organo functional silanes such as aminoalkyl silanes. Gamma-aminopropyl triethoxysilane has given excellent results when used in the amount of 0.5% with FOUNDREZ 96-880 resin.

Coating Process Parameters

The inner and outer resin coatings may be formed by a variety of methods. For example, the solvent coating process described in U.S. Pat. No. 3,929,191 to Graham et al. may be used. Other processes such as that described in U.S. Pat. No. 3,492,147 to Young et al. describes the coating of a particulate substrate with a liquid, uncatalyzed resin composition characterized by its ability to extract a catalyst or curing agent from a nonaqueous solution. As stated above, the preferred resins for use with the instant invention are phenol-formaldehyde novolac resins and when using such resins the preferred coating method is a hot melt coating procedure. The following is a discussion of typical coating process parameters using the preferred phenol-formaldehyde novolac resins and the preferred hot melt coating process.

The improved high strength particles of the invention are manufacture in a two-step process. In the first step a substnatially cured phenol-formaldehyde resin inner coat is formed over the particulate substrate. The substantially cured inner coat greatly increases the crush resistance of the particles.

In the second step a second or outer resin coating is formed over the inner coating. The outer coating is a heat curable resin coating that allows the particles to form and cure into a consilidated mass which has high permeability and high strength.

Formation of Inner Coating

The first or inner coating of resin is formed on the particulate substrate by first coating the heated substrate with a phenol-formaldehyde novolac resin. This coating is carried out by preheating the particulate substrate to a temperature above the melting point of the particular resin used and high enough to insure that when hexamethylenetetramine is added to the mixture that the resin is substantially cured. Substantially cured, as used herein, is to be interpreted as meaning that the cross linking reaction of the resin is substantially complete and that at typical downhole temperatures only minimal additional curing takes place.

Typically the particulate substrate is heated to 350° to 500° F. prior to resin addition.

The heated substrate is charged to a mixer or muller where generally from about 0.5% to about 5.0%, by weight of substrate, resin is added. The preferred amount of resin based on the weight of substrate is about 3.0%.

After completion of addition of the resin to the substrate, the substrate and melted resin are allowed to mix in the muller for a time sufficient to insure the formation of a uniform coating of resin on the sand, usually about 10 to about 300 seconds. Following this mixing step from about 5 to 25%, by weight of the resin, of hexamethylenetetramine is added to the substrate resin mixture. The preferred amount of hexamethylenetetramine is about 15% or the resin weight. After addition of the hexamethylenetetramine the entire mixture is allowed to mall for approximately 1 minute. By the end of this time the resin coating on the substrate will be almost completely cured. The tumbling mass will be reduced to individual grain of dry resin coated substrate.

After the resin coated sand in the muller has broken into individual grains and appears dry, sufficient water is added to drop the temperature of the resin coated sand to about b 260° to about 320° F. From about 0.5% to about 5% of phenol-formaldehyde novolac resin by weight of the substrate, is then added to the tumbling resin coated substrate. The preferred amount of resin added for the outer coating is about 1% of the weight of the substrate.

The resulting mixture is allowed to mix for an additional period of about 30 seconds to about 5 minutes. This time must be sufficient to insure complete coverage of the resin coated particles with the outer resin coating. Upon completion of mixing the resin coated mass is quenched with a solution of hexamethylenetetramine in water. Generally the amount of hexamethylenetetramine added is from about 5 to about 25% based on the weight of the outer resin coating; the preferred amount is 15%. The amount of water in which the hexamethylenetetramine is dissolved should be sufficient to cool the resin coated substrate mixture sufficiently to prevent the complete reaction of the hexamethylenetetramine with the novolac resin. The cooling effect of the water quench also serve to harden the resin coating. The amount of water needed ranges generally from about 1 to 5 gallons per thousand lbs of substrate. Generally, a 10% solution of hexamethylenetetramine is adequate to both disperse the hexamethylenetetramine and sufficiently quench the reaction.

Following addition of the hexamethylenetetramine water solution the mixture is mulled for an additional 20 to 180 seconds. Again the tumbling mass of resin coated particulate substrate reduces to individual grains and appears dry. Following this additional mixing, the resin coated substrates is discharged from the muller for standard processing such as screening, dust removal, cooling and storage or bagging.

EXAMPLE

The following example is a description of a plant size experimental batch of high strength resin coated proppant. The procedure was as follows:

1. 1020 lbs of 20/30 mesh sand was charged to a heater and heated to 372° F.
2. The heated sand was charged to the muller (mixer), requiring approximately 15 seconds.
3. 27.5 lbs of FOUNDREZ ® 96-880 resin, modified with 0.5% gamma-aminopropyl triethoxysilane, was added to the sand and the muller, requiring 5 seconds.
4. After an additional 15 seconds, 4 lbs dry hexamethylenetetramine was added to the resin coated sand.
5. After an additional 65 seconds of mulling, the resin coating on the sand was almost completely cured. The tumbling mass of sand was dry and had been reduced to individual grains.

6. About 16 lbs of water was added to drop the temperature to 290° F. This water addition required 25 seconds.

7. 10 lbs of FOUNDREZ® 96-880, modified as above resin was added to the tumbling sand mass (temperature equals 290° F.). This addition required 20 seconds.

8. After an additional 80 seconds, the resin coated mass was quenched with the solution of hexamethylenetetramine in water (1.4 lbs hexamethylenetetramine in 14.1 lbs of water). The hexamethylenetetramine water addition required 15 seconds.

9. After an additional 30 seconds of mulling, the tumbling mass of resin coated sand was dry and reduced to individual grains.

10. The resin coated sand was discharged to a screen conveyor.

Test Results and Comparisons

Resin coated sand prepared by the above procedure was compared to other commercial proppants in a crush test. The unconsolidated resin coated sand and other proppants were subjected to 10,000 psi, at 72° F. The test loading was 4.0 lbs per square foot of proppant. All proppants were 20/40 mesh. The reported amount crushed at 10,000 psi is the percentage of proppant that would pass through a 40 mesh screen.

TABLE

| API Crush Test | |
|---|---|
| Proppant | Amount Crushed (%) at 10,000 psi |
| Dual coated sand of the invention | 2.4 |
| SUPER SAND | 19.5 |
| ACFRAC CR | 23.3 |
| ACFRAC PR | 2.4 |
| Norton INTERPROP | 3.7 |
| Unimin sand | 41.5 |

The first three materials, the dual resin coated particles, SUPER SAND and ACFRAC CR are all curable resin coated sand. SUPER SAND is manufactured by Santrol Products and ACFRAC CR by Acme. As is seen the crush resistance of the dual coated sand is substantially superior to that of the two conventional resin coated sands. The last three proppants are non-consolidating proppants. Unimin sand is a silica sand from Minnesota. INTERPROP is a sintered bauxite and ACFRAC PR is cured resin coated sand. While the ACFRAC PR and INTERPROP are comparable in their crush resistance they lack the advantages of self-consolidating proppants.

The ability of the dual coated sand to resist high closure stress prior to curing the outer resin coating insures that both the advantages of a high-strength proppant and the advantages of a self-consolidating proppant can be realized.

FORMATION TREATMENT

The free-flowing, heat curable particles as produced by the above method may be used as proppants or fluid loss agents in hydraulic fracturing. In carrying out a hydraulic fracturing operating a fracture is first generated by injecting a viscous fluid into the formation at a sufficient rate and pressure to cause the formation to fail in tension. Injection of the fluid is typically continued until a fracture of the desired geometry is obtained. A carrier fluid having the proppant suspended therein is then pumped into the fracture. The temperature of the carrier fluid during pumping operations will be low so as to prevent premature curing of the outer resin coat. The carrier fluid bleeds off into the formation and deposits the propping agent in the fracture. This process is controlled by fluid loss agents which are small aggregate particles which temporarily slow the fluid loss to the formation.

After the proppant is placed, the well is shut in with pressure maintained on the formation. As the pressure within the fracture approaches the normal formation pressure, the fracture walls close in on the proppant and apply an overburden stress thereto. The strength imparted by the inner coating maintains the integrity of the proppant. At the same time ambient formation temperature heats the outer resin coating. Initially, the resin fuses and unites at contact areas between contiguous particles or with the formation walls. As the temperature increases the polymerization reaction proceeds until the resin is cured into an insoluble and infusible cross-linked state. The pendular regions between adjacent particles bond the packed particles into a permeable mass having considerable compressive strength.

A more detailed description of the standard industry practices for the use of such heat curable particles in hydraulic fracturing and gravel pack completion is disclosed in U.S. Pat. No. 3,929,191 which is hereby incorporated by reference.

Further modifications and alternate embodiments of the invention will be apparent to those skilled in the art in view of this description. Accordingly, this description is to be considered as illustrative only and for the purpose of teaching those skilled in the art the manner of carrying out the invention. Various modifications may be made in the method. Applicants intend that all such modifications, alterations and variations which fall within the spirit and scope of the appended claims be embraced thereby.

What is claimed is:

1. A process for the preparation of high strength self-consolidating dual resin coated particles comprising:
   providing a particulate substrate;
   coating said particulate substrate with a curable inner resin coating;
   substantially curing said inner coating resin to produce a substantially cured resin coated particle having increased crush resistance;
   coating said substantially cured resin coating particle with an outer coating of fusible curable resin;
   hardening said outer resin coating so as to form a free flowing high strength self-consolidating dual resin coated particle.

2. The process of claim 1 wherein said particulate substrate is chosen from the group consisting of silica sand, glass, sintered bauxite or aluminum oxide.

3. The process of claim 1 or 2 wherein the resins of said inner resin coating and said outer resin coating are individually selected from the group consisting of phenol-aldehyde resins, epoxy resins, urea-aldehyde resins, melamine-aldehyde resins, furfuryl alcohol resins, polyester resins and alkyd resins.

4. The process of claim 3 wherein said resin of said inner coating has a coupling agent reactive with said substrate incorporated into said resin so as to increase the strength of the resin-substrate bond.

5. The process of claim 4 wherein said coupling agent is an organo-functional silane.

6. The process of claim 5 wherein said organo-functional silane is an aminoalkyl silane.

7. The process of claim 3 wherein said resins of said inner and outer coatings are phenol-formaldehyde resins.

8. The process of claim 7 wherein said resin of said outer coating is a phenol-formaldehyde novolac resin having sufficient unreacted hexamethylenetetramine incorporated therein to render said outer coating heat reactive.

9. A process for the preparation of high strength self-consolidating dual resin coated particles comprising:
providing a particulate substrate suitable for use as a proppant;
providing a first fusible curable phenol-formaldehyde resin;
heating said particulate substrate to a temperature sufficient to melt and cure said first phenol-formaldehyde resin;
adding said first fusible, curable phenol-formaldehyde resin to said substrate;
mixing said substrate and said resin for a time sufficient to melt said resin and to form an inner coating of said first resin on said substrate;
curing said first resin to form a substantially cured resin coated particle having increased crush resistance;
providing a second fusible curable phenol-formaldehyde resin;
adding said second fusible curable phenol-formaldehyde resin to said substantially cured resin coated particles wherein said substantially cured resin coated particles are at a temperature sufficient to melt said second resin;
mixing said substantially cured resin coated particles and said second resin for a time sufficient to melt said second resin and to form an outer coating of said second resin over said inner coating, thereby forming dual resin coated particles;
rapidly cooling said dual resin coated particles so as to harden said outer coating and prevent substantial curing of said outer coating.

10. The process of claim 9 wherein said first resin is a resole.

11. The process of claim 9 wherein said first resin is a novolac.

12. The process of claim 11 wherein hexamethylenetetramine is added to said substrate and said first resin in an amount sufficient to substantially cure said inner coating.

13. The process of claim 9 wherein said second fusible, curable resin is a novolac resin rendered heat reactive by the incorporation of a sufficient amount of unreacted hexamethylenetetramine.

14. The process of claim 13 wherein said hexamethylenetetramine is added as an aqueous solution, wherein said aqueous solution also acts to rapidly cool said dual resin coated particles.

15. A process for the preparation of high strength self-consolidating dual resin coated particles comprising:
providing a particulate substrate selected from the group consisting of silica sand, glass, sintered bauxite and aluminum oxide;
providing a first fusible curable phenol-formaldehyde novolac resin;
heating said particulate substrate to a temperature sufficient to melt and cure said first resin;
adding said first resin to said substrate;
mixing said first resin and said substrate for a time sufficient to melt said resin and to form an inner coating of said first resin on said substrate;
adding sufficient hexamethylenetetramine to said first resin and said substrate to substantially cure said inner coating;
curing said first resin to form a substantially cured resin coated particle having increased crush resistance;
providing a second fusible curable phenol-formaldehyde novolac resin;
adding said second resin to said substantially cured resin coated particles wherein said substantially cured resin coated particles are of a temperature sufficient to melt said second resin;
mixing said substantially cured resin coated particles and said second resin for a time sufficient to melt said second resin and to form an outer coating of said second resin over said inner coating thereby forming dual resin coated particles;
providing an aqueous solution containing sufficient hexamethylenetetramine to render said outer coating of said second resin heat reactive;
adding said aqueous solution of hexamethylenetetramine to said dual resin coated particles so as to physically incorporate said hexamethylenetetramine into said outer coating and cool said outer coating to both harden said outer coating and substantially prevent further curing of said outer coating.

16. The process of claim 15 wherein said particulate substrate is heated to a temperature of about 350° F. to about 500° F.

17. The process of claim 16 wherein the temperature of said substantially cured resin coated particles is adjusted to about 260° to about 320° prior to the addition of said second resin.

18. The process of claim 17 wherein the amount of water in said aqueous solution is from about 1 to about 5 gallons per 1000 lbs of dual resin coated particles.

* * * * *